UNITED STATES PATENT OFFICE.

CYPRIEN MARIE TESSIÉ DU MOTAY AND CHARLES RAPHAEL MARÉCHAL, OF METZ, FRANCE.

IMPROVED MODE OF PRODUCING OXYGEN GAS.

Specification forming part of Letters Patent No. 70,705, dated November 12, 1867.

*To all whom it may concern:*

Be it known that we, CYPRIEN MARIE TESSIÉ DU MOTAY and CHARLES RAPHAEL MARÉCHAL, of Metz, in the Empire of France, have invented a certain new and Improved Mode of Manufacturing or Producing Oxygen Gas; and we hereby declare the following to be a full, clear, and exact description of the same.

Our system of producing or manufacturing oxygen gas is based primarily upon the fact that atmospheric air is the most natural and richest source of this gas.

This system, which forms the subject of the present application for Letters Patent, consists essentially in abstracting or borrowing the oxygen from the atmosphere by causing it to be absorbed by certain chemical compositions, which have the property of becoming decomposed at certain temperatures, and of abandoning or releasing, when in this state, their oxygen, which can then be gathered or collected apart by itself.

The different chemical compositions which we can employ may, according to the manner in which they are affected by the oxygen, be divided into two distinct groups, which, consequently, give rise to two methods of manufacturing gas under our system of abstracting or borrowing it from atmospheric air.

The first method permits oxygen to be obtained by the decomposition and recomposition of sulphuric acid. It consists in the employment of the oxide of magnesium—never before, to our knowledge, used for this purpose—which oxide absorbs and re-absorbs sulphurous acid, and thus allows it to borrow or abstract from the atmosphere a part of the oxygen it contains. All the oxides or silicates of metals, such as the oxides of aluminium, iron, zinc, and the silicate of alumina, for example, which, at either a dull or a bright red heat, cease to be united with sulphuric acid, decompose this acid into sulphurous acid and oxygen. We gather the oxygen and the sulphurous acid thus generated into vessels containing either the oxide or the carbonate of magnesia. The sulphurous acid is thus transformed into sulphite of magnesia, while the oxygen, which is disengaged and left free, can be collected in a gasometer. The sulphite of magnesia produced by this reaction is heated in a retort and is there decomposed. The sulphurous acid reproduced is returned or conducted off into a chamber of lead or any other suitable apparatus for producing sulphuric acid. Upon contact with air, steam, or nitrous gases the sulphurous acid becomes transformed into sulphuric acid, while the magnesia, which is released, is again fit to be used in the process. The regenerated or reproduced sulphuric acid upon coming out of the leaden chamber is decomposed anew into sulphurous acid and oxygen, and so the process may be continued as long as required.

The second method of producing the gas is based upon the following facts: The manganates and permanganates of potash, of soda, and of baryta, the chromates of potash, of soda, and of baryta, the ferrates of potash, of soda, and of baryta, and in general all metallic acids or oxides forming, with potash, soda, and baryta, binary combinations capable of becoming superoxidized, possess the property of abandoning their oxygen at a temperature more or less elevated when they are placed in presence of a current of vapor or steam. These bodies thus deoxidized have also the property of becoming reoxidized when exposed to the action of a current of air at a greater or less degree of temperature. It is upon this twofold property—the first of which has been discovered by us—that we base our second method of producing oxygen by means of atmospheric gas. To this end we place in a retort or other suitable distilling-vessel one of the above-named binary compositions, either in the lowest or in the highest state of oxidation. If the binary composition be in a minimum state of oxidation we superoxidize the composition by means of a current of air induced by any suitable means. If the composition be in the maximum state of oxidation we deoxidize it by means of a current of steam or vapor, or an injection of water. The oxygen and the steam or vapor upon coming out of the retort pass together into a condenser, the steam is condensed, and the oxygen passes into a gasometer where it is collected and held. When all the utilizable oxygen contained in the binary composition has been disengaged by the action of the steam the operation of superoxidation by means of air takes place, and vice versa. The production of the oxygen may thus be continued so long as there is any need of the gas.

When we ourselves prepare the binary compositions employed under this method we make use of the following chemical reactions: Our alkaline manganates are produced by the oxidation of the hydrates of potash and of soda by means of a current of air in the presence of the sesquioxide and of the peroxide of manganese.

The oxygen thus cheaply and readily produced may be applied to innumerable uses. It can be employed in metallurgy for the fusion of metals at a high temperature. In chemistry it will serve naturally as an oxidizing agent of extreme power. But one of the most important and considerable uses to which it may be put is for illuminating, by burning with the said oxygen gases, oils, hydrocarbons, and other combustible liquids. For this purpose we have manufactured pencils or crayons composed of an earthy oxide, such as magnesia, chalk, or strontian, and of an agglutinous substance, such as coal, resin, or other animal or vegetable combustible matter. These materials being pulverized, mixed, and compressed under a pressure of about twenty-five atmospheres will furnish crayons or pencil-like rods of cylindrical or other suitable form, which, after having been baked, will constitute extremely porous bodies, permitting, in the presence of oxygen, the combustible substances to burn with an intense and steady flame.

Having now described our invention, and the manner in which the same is, or may be, carried into effect, what we claim, and desire to secure by Letters Patent, is—

The method of, and means for, obtaining oxygen gas from atmospheric air, substantially as and for the purposes herein set forth and described.

In testimony whereof we have signed our names to this specification before two subscribing witnesses.

TESSIE DU MOTAY.
C. R. MARÉCHAL.

Witnesses:
  JAMES HAND,
  J. ARMENGAUD.